US006391409B1

(12) United States Patent
Yeh et al.

(10) Patent No.: US 6,391,409 B1
(45) Date of Patent: May 21, 2002

(54) POWDER-FREE NITRILE-COATED GLOVES WITH AN INTERMEDIATE RUBBER-NITRILE LAYER BETWEEN THE GLOVE AND THE COATING AND METHOD OF MAKING SAME

(75) Inventors: Yun-Siung Tony Yeh, Libertyville; Duanna Zhu, Ingelside, both of IL (US)

(73) Assignee: Allegiance Corporation, McGaw Park, IL (US)

( * ) Notice: Subject to any disclaimer, the term of this patent is extended or adjusted under 35 U.S.C. 154(b) by 0 days.

(21) Appl. No.: 09/248,938

(22) Filed: Feb. 12, 1999

(51) Int. Cl.$^7$ .................. A41D 19/015; B32B 1/10; B32B 25/08; B32B 25/14
(52) U.S. Cl. .................. 428/35.7; 2/161.7; 2/168; 428/35.7; 428/36.8; 428/36.9; 428/36.91; 428/492; 428/495; 428/515; 428/516; 428/519; 428/520; 428/521
(58) Field of Search ............... 428/35.7, 36.8, 428/36.9, 36.91, 492, 515, 520, 521, 495, 516, 519, 522; 2/161.7, 168

(56) References Cited

U.S. PATENT DOCUMENTS

| 4,143,109 A | * | 3/1979 | Stockum | 264/112 |
|---|---|---|---|---|
| 5,069,965 A | * | 12/1991 | Esemplare | 428/330 |
| 5,084,514 A | * | 1/1992 | Szczechura et al. | 525/123 |
| 5,284,157 A | * | 2/1994 | Miller et al. | 128/844 |
| 5,670,263 A | * | 9/1997 | Gazeley | 428/492 |
| 5,742,943 A | * | 4/1998 | Chen | 2/168 |
| 5,910,533 A | * | 6/1999 | Ghosal et al. | 524/560 |
| 6,000,061 A | | 12/1999 | Taneja et al. | 2/168 |
| 6,020,070 A | * | 2/2000 | Hoerner et al. | 428/423.1 |

FOREIGN PATENT DOCUMENTS

| JP | 60026077 A | * | 2/1985 |
| WO | WO 00/29478 | | 5/2000 |

* cited by examiner

*Primary Examiner*—Harold Pyon
*Assistant Examiner*—Sandra M. Nolan
(74) *Attorney, Agent, or Firm*—Andrew G. Rozycki

(57) ABSTRACT

Powder-free natural rubber and synthetic elastomer gloves having an inner coating of a nitrile rubber with an intermediate layer of a rubber blend comprised of natural or synthetic rubber and nitrile rubber interposed between the nitrile coating and the base glove and their method of manufacture are described. The intermediate layer of the rubber blend interposed between the coating and the glove imparts a unique surface texture to the glove which aids donning and eliminates self-sticking of the inner glove surfaces, especially after the glove has been sterilized by radiation. Additionally the gloves of the invention exhibit good grippability, good donnability, superior tensile strength, elongation to break and stress at 500% elongation.

19 Claims, 2 Drawing Sheets

POWDER-FREE NITRILE-COATED GLOVES WITH AN INTERMEDIATE RUBBER-NITRILE LAYER BETWEEN THE GLOVE AND THE COATING AND METHOD OF MAKING SAME

BACKGROUND OF THE INVENTION

The majority of commercially available powder-free latex gloves are manufactured by first preparing a powdered glove on-line and then removing the powder from the glove by chlorination and rinsing off-line. The chlorination process oxidizes the natural rubber surface of the glove thereby providing improved dry donning characteristics. Chlorination also removes any powder deposited on the gloves during the rinsing operation.

Other powder free gloves have been produced by using powder free coating technology in combination with chlorination or other post treatment processes. Some of these coated gloves use a manufacturing process which requires that the rubber substrate be treated with acid or other harsh chemicals to improve adhesion of the coating to the base rubber glove. This additional chemical processing step is not preferable in glove manufacturing because the chemicals used are generally corrosive and/or difficult to handle in large scale production processes. Additionally, most of the coated and non-coated gloves do not have acceptable donning characteristics with respect to damp and wet skin, which is one of the critical product requirements for surgical glove applications. Finally, some of these gloves also exhibit self-sticking between the inner glove surfaces which create difficulties for health care workers trying to don the gloves in a sterile environment.

SUMMARY OF THE INVENTION

The present invention provides a powder-free, inner-nitrile rubber coated, natural rubber or synthetic elastomer glove for medical and industrial applications which has good donning characteristics and good grippability (as measured by the coefficient of friction of the donning and gripping surfaces). The glove of the invention also exhibits good tensile strength, stress at 500% elongation and elongation to break.

The inner coating on the gloves of the invention is a cross-linked nitrile rubber blended with a silicone. Interposed between the nitrile rubber coating and the elastomeric glove is an intermediate layer of a rubber blend comprised of natural or synthetic rubber and nitrile rubber. Comparative testing demonstrates that the inventive gloves have improved adhesion between the coating and the base glove as compared to those coated gloves which do not contain the intermediate layer of rubber blend. The gloves of the invention also exhibit good donning with respect to both dry and wet skin. The inventive gloves also have a unique surface texture which improves donnability.

PREFERRED EMBODIMENTS OF THE INVENTION

Figure 1A:
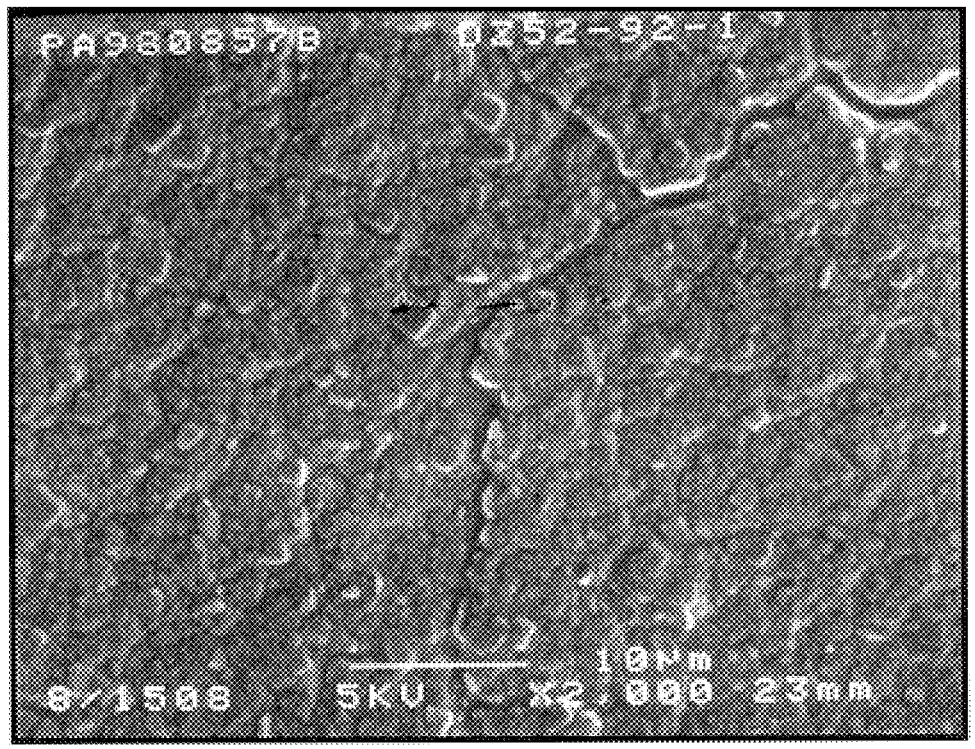
FIG. 1A is a scanning electron microscope (SEM) photograph (×2000 magnification) of the interior surface of a prior art natural rubber latex glove which contains neither an intermediate layer nor an inner nitrile coating. The glove has been chlorinated and lubricated.

The gloves of the invention are comprised of a natural rubber, nitrile, polychloroprene, polybutadiene, polyvinylchloride, polyurethane, synthetic polyisoprene, styrene diblock and triblock copolymers, or other synthetic elastomers, including blends thereof, which have on their inner surface a coating comprised of a cross-linked nitrile rubber blended with silicone with an intermediate layer of a rubber blend of natural or synthetic rubber interposed between the elastomeric glove and the coating of nitrile rubber.

The natural rubber used to form the base glove may be compounded with stabilizers, a crosslinker, a vulcanization activator, a vulcanization accelerator, an antioxidant, an antiozonant and optionally, white or other colored pigments.

Suitable stabilizers include oleates, stearates, alginates, polyacrylates, xanthan gums, caseinates or other nonionic and ionic surfactants. Typical crosslinkers which may be used in the compounding formulation include sulfur or other organic peroxides. Suitable vulcanization activators include metal oxides, such as magnesium oxide, lead oxide, and preferably, zinc oxide. The vulcanization accelerator may be chosen from mercaptobenzothiazoles and their derivatives, dithiocarbamates and their derivatives, sulfur donors, guanidines and aldehyde-amine reaction products. Suitable antioxidants include hindered arylamines or polymeric hindered phenols. Typical antiozonants which may be used in the compounding formulation include paraffinic waxes, microcrystalline waxes and intermediate types of waxes (which are blends of both paraffinic and microcrystalline waxes). Typical white pigments that may be used include titanium dioxide and zinc oxide.

Synthetic diene based elastomers used to form the base glove such as polybutadiene, synthetic polyisoprene, nitrile, polychloroprene and its blends can be compounded with similar compounding ingredients as set forth above. Other synthetic thermoplastic elastomeric materials used for the base glove such as polyvinylchloride, polyurethanes, styrene diblock and triblock copolymers and its blends do not require crosslinking to prepare a glove with the desired physical properties. Accordingly, these synthetic elastomers may be compounded with stabilizers, antioxidants, antiozonants and color pigments as described above.

Those skilled in the art will readily be able to vary the compounding ingredients in the dipping formulation to suit the particular elastomers used to form the base glove as well as the final article desired.

An intermediate layer of a rubber blend comprised of a natural or synthetic rubber and nitrile rubber is interposed between the elastomeric glove and the nitrile coating by dipping the glove a second time after coagulation has formed the base glove layer. The nitrile rubber latex used to form the intermediate rubber blend is a carboxylated acrylonitrile butadiene terpolymer dispersion. The carboxylated acrylonitrile butadiene terpolymer preferably has an acrylonitrile content of about 25 to about 40 parts, a butadiene content of about 55 to about 68 parts and a carboxylic acid content of about 3 to about 6 parts. The carboxylated acrylonitrile butadiene terpolymer most preferably has an acrylonitrile/butadiene/carboxylic acid ratio of 39/58/3.

For a base glove comprised of natural rubber, the intermediate layer is preferably comprised of a blend of natural rubber and nitrile rubber. For a base glove comprised of a synthetic rubber, the intermediate layer is preferably comprised of a blend of the same synthetic rubber used to form the base glove and nitrile rubber. The rubber blend latex which forms the intermediate layer is compounded with stabilizers, a crosslinker, a vulcanization activator, a vulcanization accelerator and the following optional ingredients: an antioxidant, an antiozonant and white or colored pigments.

Suitable stabilizers include oleates, stearates, alginates, polyacrylates, xanthan gums, caseinates and other nonionic and ionic surfactants. Preferably the stabilizers are caseinates and surfactants. Most preferably, the stabilizer is a non-ionic and/or ionic surfactant.

Typical crosslinkers used in the compounding formulation include sulfur, and organic peroxides. Preferably, the crosslinker is sulfur.

Suitable vulcanization activators include metal oxides, such as magnesium oxide, lead oxide and preferably, zinc oxide. The vulcanization accelerator may be chosen from mercaptobenzothiazoles and their derivatives, dithiocarbamates and their derivatives, sulfur donors, guanidines and aldehyde-amine reaction products.

Suitable antioxidants include hindered arylamines and polymeric hindered phenols. Typical antiozonants which may be used in the compounding formulation include paraffinic waxes, microcrystalline waxes and intermediate types of waxes (which are blends of both paraffinic and microcrystalline waxes). Typical white pigments that may be used include titanium dioxide and zinc oxide.

The compounding ingredients used to prepare the intermediate rubber blend layer dispersion and their relative proportions are set forth below in Table 1. The total percent solid of this dispersion is adjusted to be about 1.0 to 10%. The total amount of natural rubber/synthetic rubber and nitrile rubber will be about 100 parts.

TABLE 1

| Dispersion Ingredient | Dry or Active Parts By Weight |
| --- | --- |
| Natural rubber/Synthetic rubber dispersion | About 0 to about 100 |
| Nitrile rubber dispersion | About 100 to about 0 |
| Stabilizers (unless added by manufacturer) | About 0.01 to about 5 |
| Crosslinker | About 0.1 to about 10 |
| Vulcanization Accelerator | About 0.1 to about 10 |
| Vulcanization Activator | About 0.1 to about 10 |
| Antioxidants (optional) | About 0.1 to about 5 |
| Antiozonant (optional) | About 0.1 to about 5 |
| White or colored pigment (optional) | About 0.1 to about 5 |

The nitrile rubber latex used to coat the interior surface of the formed glove is a carboxylated acrylonitrile butadiene rubber dispersion, preferably, a dispersion of a carboxylated acrylonitrile butadiene terpolymer containing an acrylonitrile content of about 25 to about 40 parts, a butadiene content of about 55 to about 68 parts and a carboxylic acid content of about 3 to about 6 parts. More preferably, the nitrile rubber latex is a blend of two carboxylated acrylonitrile butadiene rubber dispersions of different acrylonitrile/butadiene/carboxylic acid ratios [A and B in Table 2]. Most preferably, the nitrile rubber latex is a dispersion blend of a carboxylated acrylonitrile butadiene rubber with an acrylonitrile/butadiene/carboxylic acid ratio of about 39/58/3 and a carboxylated acrylonitrile butadiene rubber with an acrylonitrile/butadiene/carboxylic acid ratio of about 39/55/6. A single nitrile rubber dispersion may be used instead of a nitrile blend dispersion for ease of material handling and manufacturing, preferably a carboxylated acrylonitrile butadiene rubber with an acrylonitrile/butadiene/carboxylic acid ratio of about 39/55/6. For use as part of the coating on the interior of the gloves of the invention, the nitrile rubber dispersion is additionally compounded with a crosslinker, vulcanization accelerator, vulcanization activator and silicone.

The crosslinker may be chosen from sulfur, organic peroxides and metal oxides. Preferably, the crosslinker is selected from the group consisting of sulfur and metal oxides. Most preferably, the crosslinker is sulfur.

The vulcanization activator may be metal oxides. The preferred metal oxides are magnesium and zinc oxide. The most preferred metal oxide is zinc oxide.

The vulcanization accelerator is chosen from mercaptobenzothiazoles and their derivatives, dithiocarbamates and their derivatives, sulfur donors, guanidines and aldehyde-amine reaction products. Preferably, the accelerator chosen from the dithiocarbamates and their derivatives. Most preferably, the accelerator is a dispersion of zinc dibutuyidithiocarbamate.

The silicone emulsion is a siloxane based silicone emulsion. Preferably, the silicone is a poly(alkylsubstituted siloxane) emulsion. Most preferably, the silicone emulsion is a poly(dimethylsiloxane) emulsion.

The compounding ingredients used to prepare the nitrile rubber powder free dispersion and their relative proportions are set forth below in Table 2. The total amount of [A] and [B] will be about 100 parts.

TABLE 2

| DISPERSION INGREDIENT | DRY OR ACTIVE PARTS BY WEIGHT |
| --- | --- |
| Nitrile rubber dispersion [A] | About 0 to about 100 |
| Nitrile rubber dispersion [B] | About 100 to about 0 |
| Crosslinker | About 0.1 to about 10 |
| Vulcanization Accelerator | About 0.1 to about 10 |
| Vulcanization Activator | About 0.1 to about 10 |
| Silicone Emulsion | About 0.1 to about 25 |

Those skilled in the art will readily be able to vary the compounding ingredients in the dipping formulation to suit the final synthetic or natural rubber article desired.

The nitrile-based powder-free dispersion can be used to coat the interior of a variety of natural rubber and synthetic elastomer articles, including surgical and examination gloves, industrial gloves, finger cots, tubing, protective sheaths and catheter balloons for medical applications.

The gloves fabricated in accordance with the present invention may be prepared as follows. A mold in a contoured shape of a glove is first oven dried and then dipped into an alcohol or water-based coagulant dispersion comprising calcium nitrate, powder (calcium carbonate or cornstarch), wetting agent and water or alcohol (for alcohol based coagulant dispersion). The coagulant layer deposited on the glove former is then dried. The glove former is then dipped into the compounded natural rubber latex or synthetic elastomer dispersion and a film of the natural rubber or synthetic elastomer is coagulated on the glove former. While still on the former, the layer of coagulated natural rubber or synthetic elastomer is then dipped into a blend of natural rubber and nitrile rubber dispersion or a blend of synthetic rubber and nitrile rubber dispersion to form an intermediate layer on the glove. The glove is optionally leached with water and then dipped into a powder-free dispersion comprising a nitrile rubber, a silicone emulsion, a cross-linker, a vulcanization accelerator and a vulcanization activator as set forth in Table 2. The former carrying the nitrile rubber coated natural rubber or synthetic elastomer glove with an intermediate layer of natural rubber and nitrile rubber or synthetic rubber and nitrile rubber interposed between the nitrile rubber coating and the base glove is then cured in an oven. The former is removed from the oven and the glove is then stripped from the former.

To prepare the powder free coated gloves, the gloves are post-processed by chlorination as follows. The coated gloves are initially turned inside out with the coated surfaces on the outside of the gloves. The gloves are optionally pre-rinsed with water two times (for about 2.5 minutes per time) and immersed in an aqueous chlorinated solution in a chlorinator for about at least 6 minutes. The chlorine concentration may vary from about 100 ppm to about 1500 ppm. Preferably the chlorine concentration is about 150 to about 700 ppm. Most preferably, the chlorine concentration is about 250 ppm to about 350 ppm. After chlorination, the chlorinated solution is neutralized by adding a base (e.g., sodium hydroxide or ammonium hydroxide) to the solution and the gloves are then tumbled for about 4 minutes or until the pH of the solution is about 7 or above. The neutralized solution is then drained and the gloves are rinsed with water for about 2.5 minutes. The gloves may be rinsed three more times (for about 2.5 minutes per time) to remove traces of the chlorinated solution.

For medical, examination and industrial glove applications, after rinsing, the gloves are dried at about 55° C. for about 20 minutes. The gloves are then turned again so that the coated surface is on the inside of the glove. The gloves are then dried again at about 50° C. for about 5 minutes.

Alternatively, for medical, examination and industrial applications, the powder-free coated gloves of the invention are prepared as set forth above except the chlorination processing steps are modified as follows. After stripping from the former, the coated gloves are optionally pre-rinsed with water and immersed in an aqueous chlorinated solution in a chlorinator for at least about 6 minutes. The chlorine concentration may vary from about 100 ppm to about 1500 ppm. Preferably, the chlorine concentration is about 150 to about 700 ppm. Most preferably, the chlorine concentration is about 250 ppm to about 350 ppm. After chlorination, the chlorinated solution is neutralized by adding a base to the solution and the gloves are then tumbled for about 4 minutes or until the pH of the solution is about 7 or above. The neutralized solution is then drained and the gloves are rinsed with water for about 2.5 minutes. The gloves are then rinsed three more times to remove traces of the chlorinated solution. After rinsing, the gloves are dried at about 55° C. for at least 20 minutes or until the gloves are dried. The powder-free coated gloves are now ready for packing. Preferably, the above described post-processing steps are suitable for processing a coated glove with a bead on the cuff. The beading step can be applied before or after dipping of the former with the intermediate rubber blend layer into the powder-free nitrile rubber dispersion as described above.

For surgical glove applications, the gloves are preferably lubricated after chlorination with a lubricant solution to provide good donning characteristics with respect to damp and wet skin. For these applications the rinsed gloves are removed from the chlorinator and placed in an extractor/lubricator/dryer. The gloves are extracted to remove excess water and a lubricant solution is then applied to the coating surface, e.g., by spraying or by tumbling. The lubrication solution is preferably comprised of about 0.3 wt % to about 0.75 wt. % cetylpyridinium chloride and about 0.10 wt % to about 1 wt. % silicone emulsion. After the lubricant application, the gloves are dried at about 55° C. for about 20 minutes. After the first dry, the gloves are turned inside out so that the coated surfaces are on the inside of the glove. The gloves are then dried again at about 50° C. for about 5 minutes.

Other suitable lubricants that may be used to provide wet and damp donning characteristics are nonionic and ionic surfactants. Among these surfactants, the cationic and amphoteric surfactants are most preferred for these applications. These surfactants may also be combined with other lubricants such as silicones, stearates, or other water soluble polymers such as chitosan, polyethylene oxide or polyvinyl alcohol, to provide acceptable donning features for surgical glove applications The finished gloves are packaged and sent for sterilization by gamma or electron beam radiation.

The gloves of the invention have a thickness of at least about 0.003 inches. Preferably, the thickness of the gloves ranges between about 0.004 inches and about 0.012 inches. Most preferably, the glove thickness is between about 0.005 and about 0.009 inches.

The gloves of the invention exhibit a tensile strength of greater than about 1300 psi, preferably greater than about 2600 psi and most preferably, greater than about 3500 psi. The stress at 500% of the gloves of the invention is less than about 3000 psi, preferably less than about 2000 psi and most preferably, less than about 1000 psi. The gloves of the invention have an elongation at break greater than about 200%, preferably greater than about 500% and most preferably greater than about 800%.

The gloves of the invention exhibit a dry kinetic COF of less than about 0.6 for the donning (coated) inner surface and greater than about 0.6 for the gripping (uncoated) outer surface. Preferably, the dry kinetic COF is less than about 0.5 for the donning surface and greater than about 0.7 for the gripping surface. Most preferably, the dry kinetic COF is less than about 0.4 for the donning surface and greater than about 0.8 for the gripping surface.

The glove thickness is measured by a digital thickness gauge and is the average of three measurements in the palm area. Tensile strength, stress at 500% elongation and elongation to break are measured according to ASTM D412-92. Dry kinetic COF is measured according to ASTM D1894.

The gloves of the invention were further characterized by scanning electron microscopy (SEM) at ×2000 magnification which illustrated the difference in surface morphology between gloves with and without an intermediate layer and the nitrile inner coating.

Figure 1B:
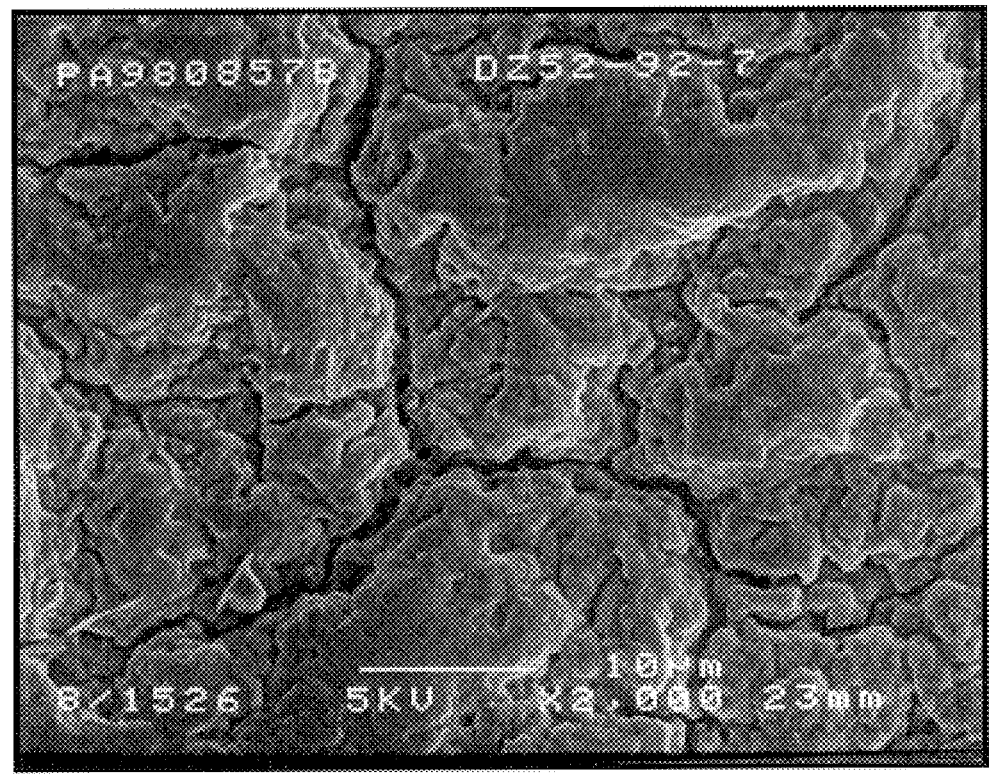
FIG. 1B is a scanning electron microscope (SEM) photograph (×2000 magnification) of the interior surface of a natural rubber latex glove in accordance with the invention which has an intermediate layer containing 2.5% total solids and an inner nitrile coating containing 5.0% total solids. The glove has been chlorinated and lubricated.

FIG. 1A is a SEM photograph of the inner glove surface of a prior art powder free natural rubber latex glove without the intermediate rubber blend layer and the inner nitrile coating layer and FIG. 1B is a SEM photograph of the inner glove surface of the inventive powder free coated natural rubber latex glove. Comparison of the two figures clearly shows that the coated glove surface exhibits rough domains on the order of about 10 micrometers with unique surface texturing, whereas the non-coated natural rubber surface shows a typical natural rubber surface with microdomains of less than 1 micrometer. The unique surface texture of the gloves of the invention provides a reduced surface contact area which contributes to the reduction or elimination of self-sticking of the inner glove surfaces. The unique surface texture also facilitates glove donning.

Figure 2A:
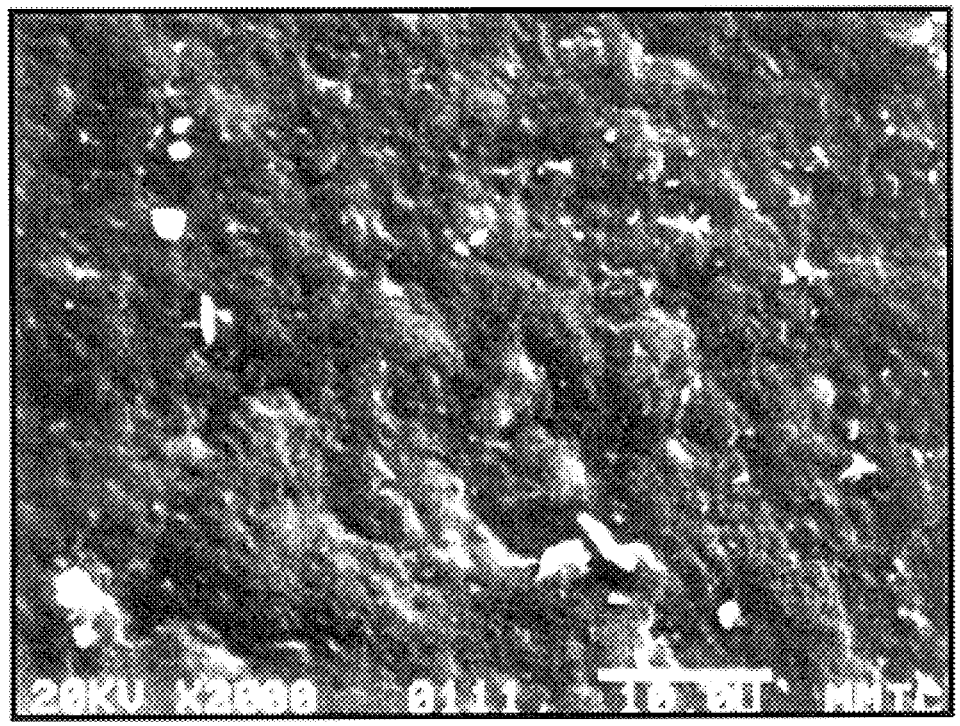
FIG. 2A is a scanning electron microscope (SEM) photograph (×2000 magnification) of the interior surface of a natural rubber latex glove which does not contain an intermediate layer but which has a nitrile coating. The glove has not been chlorinated or lubricated.
Figure 2B:
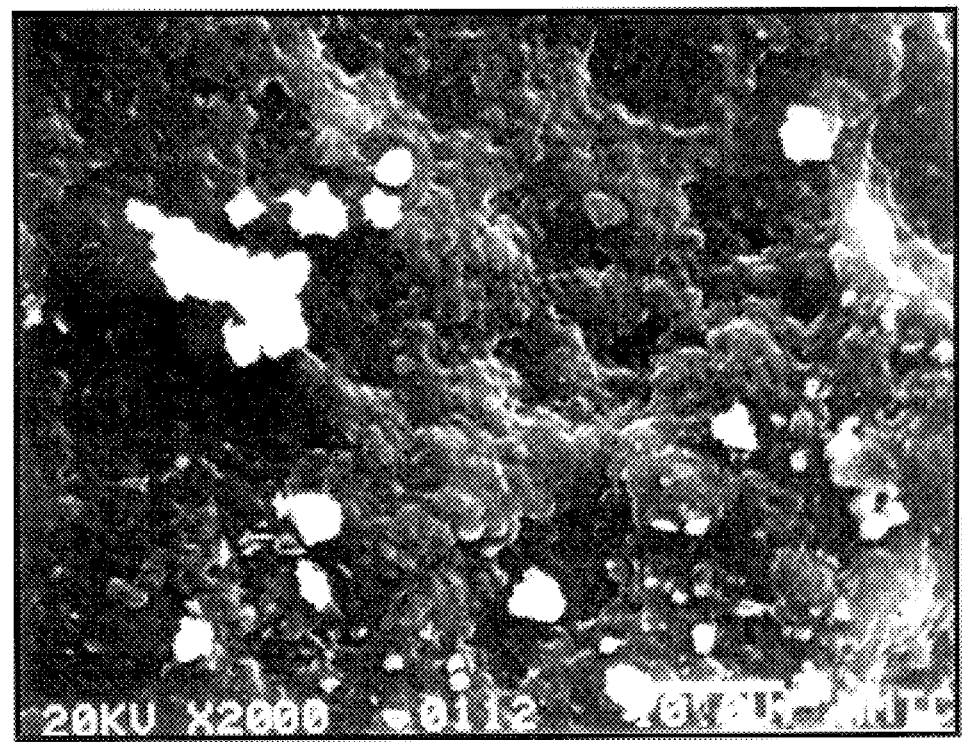
FIG. 2B is a scanning electron microscope (SEM) photograph (×2000 magnification) of the interior surface of a natural rubber latex glove which has an intermediate layer but which has no nitrile coating. The glove has not been chlorinated or lubricated.

FIGS. 2A and 2B illustrate that the unique surface texturing on the coated glove is mainly due to the presence of the intermediate rubber blend layer. FIG. 2A is a SEM photograph of the inner glove surface of a nitrile coated natural rubber latex glove without the intermediate rubber blend layer and FIG. 2B is a SEM photograph of the inner glove surface of a natural rubber latex glove coated with just the intermediate rubber blend layer. It is apparent that the intermediate rubber blend coated surface shown in FIG. 2B exhibits numerous cavities with pore diameters of about 5–10 micrometers which are absent in the nitrile coated surface without the intermediate rubber blend layer.

The improved adhesion exhibited by the gloves with an intermediate layer or rubber blend as compared to similarly coated gloves which do not contain the intermediate layer of rubber blend is illustrated by the following comparative example.

COMPARATIVE EXAMPLE 1

A nitrile-coated natural rubber latex glove with an intermediate natural rubber-nitrile layer between the glove and the nitrile coating was prepared as follows. A glove former was pre-heated in an oven at about 50° C. for about 2 minutes. The preheated former then was dipped into a stirred, water based coagulant suspension. maintained at a temperature between about 50° C. to about 55° C. The coagulant-dipped former was then returned to the heated oven for about 2 to about 3 minutes to dry the coagulant layer.

The coagulant-coated former was dipped into a compounded natural rubber latex for a time sufficient to produce the desired glove thickness. The natural rubber latex was compounded with stabilizers, crosslinker, vulcanization activator, vulcanization accelerators, antioxidant, antiozonant and white pigment. The solid content of the compounded latex was about 40 wt %. The former bearing the coagulated latex was then removed from the compounded natural rubber latex and immediately dipped into a second rubber blend latex for about 13 to 15 seconds. The rubber blend latex comprised about 0.75% compounded natural rubber latex and about 0.75% of carboxylated acrylonitrile butadiene latex and about 98.5% water. The formulation of the compounded natural rubber latex used in this rubber blend latex was the same as the one used in the first latex dipping. The acrylonitrile/butadiene/carboxylic acid ratio of the nitrile rubber was 39/58/3.

The former was removed from the second rubber blend latex and leached in water maintained at about 50° C. for about 5 minutes. The former was then dipped into a compounded nitrile blend latex with a total solid content of about 5% to form a coating on the intermediate natural rubber-nitrile blend layer. The nitrile blend was comprised of a 50/50 blend of two carboxylated acrylonitrile butadiene rubber latices with two different acrylonitrile/butadiene/carboxylic acid ratios, 39/58/3 and 39/55/6. The nitrile blend latex was further compounded with 1 part of sulfur dispersion (crosslinker), 1 part of ZDBC dispersion (vulcanization accelerator), 3 parts of ZnO dispersion (vulcanization activator) and 15 parts of silicone emulsion. The former was removed from the compounded nitrile blend latex and placed in an oven at about 125° C. for about 20 minutes to cure the glove. The former bearing the glove was then removed from the oven and allowed to cool. The glove was then stripped from the former.

The adhesion of the nitrile coating was evaluated qualitatively using two samples of each glove. In this test, the coated glove surface in the palm and finger areas was stretched to about 500% and the coating was rubbed repeatedly using the thumb. The coated surface was then visually examined for coating flakes and powdery substance The adhesion of the coating was rated qualitatively on a scale of 1 to 5, 1 being the worst with the entire coating flaking off the rubber substrate and 5 being the best with no visual appearance of powdery substance on the surface of the glove. Using this test, the adhesion of the inventive coating was excellent with a rating of 5 on a scale of 1 to 5, i.e., no flaking or shedding of the powder was observed after stretching the glove to about 500% and rubbing it repeatedly with the thumb.

COMPARATIVE EXAMPLE 2

A nitrile-coated natural rubber latex glove without an intermediate natural rubber-nitrile layer between the glove and the nitrile coating was prepared as follows. A glove former was pre-heated in an oven at about 50° C. for about 2 minutes. The preheated former was dipped into a stirred, water based coagulant suspension maintained at a temperature between about 50° C. to about 55° C. The coagulant-dipped former was then returned to the heated oven for about 2 to about 3 minutes to dry the coagulant layer.

The coagulant-coated former was dipped into a compounded natural rubber latex for a time sufficient to produce the desired glove thickness. The natural rubber latex was compounded with stabilizers, crosslinker, vulcanization activator, vulcanization accelerators, antioxidant, antiozonant and white pigment. The solid content of the compounded latex was about 40 wt %. The former bearing the coagulated latex was then removed from the compounded natural rubber latex and leached in water maintained at about 50° C. for about 5 minutes. The former was then dipped into a compounded nitrile blend latex with a total solid content of about 5% to form a coating on the intermediate natural rubber-nitrile blend layer. The nitrile blend coating formulation was the same as described in comparative example 1.

The adhesion of the nitrile coating was fair with a rating of 3 on a scale of 1 to 5, e.e., powdery material was shed from the glove after it was stretched to about 500% and rubbed repeatedly with a thumb.

The invention is further illustrated by the following examples. It is understood that one of ordinary skill in the art will understand how to vary the times and temperatures of the process in accordance with the article manufactured, the specific elastomer or blend employed, the particular formulation ingredients selected and the percent solid content of the rubber and rubber blend latex. Similarly, one of ordinary skill in the art will know how to select a post-processing method compatible with his individual glove manufacturing line and equipment.

Example 1

A powder-free nitrile-coated natural rubber latex glove with an intermediate natural rubber-nitrile layer between the glove and the nitrile coating was prepared as follows. Glove formers were pre-heated to about 65° C. in an oven for about 5 minutes. The preheated former then was dipped into a stirred, water based coagulant suspension maintained at a temperature between about 55° C. to about 60° C. The coagulant-dipped former was then returned to the heated oven for about 5 minutes to dry the coagulant layer.

The coagulant-coated former was dipped into a compounded natural rubber latex for a time sufficient to produce the desired glove thickness. The natural rubber latex was compounded with stabilizers, crosslinker, vulcanization activator, vulcanization accelerators, antioxidant, antiozonant and white pigment. The solid content of the compounded latex was about 38 wt. %. The former bearing the coagulated latex was then removed from the compounded natural rubber latex and immediately dipped into a second rubber blend latex for about 13 to about 15 seconds. The rubber blend latex comprised about 2.3% compounded natural rubber latex and about 2.3% of carboxylated acrylonitrile butadiene latex and about 95.4% water. The formulation of the compounded natural rubber latex used in this rubber blend latex was the same as the one used in the first latex dipping. The ratio of acrylonitrile/butadiene/carboxylic acid for the nitrile rubber was 39/58/3.

The former was removed from the second rubber blend latex and dried in a heated oven at about 58° C. The coagulated latex layer was leached in water maintained at about 55° C. to about 80° C. for about 5 minutes. The former was then dipped into a compounded nitrile blend latex with a total solid content of about 5% to form a coating on the intermediate natural rubber-nitrile blend layer. The nitrile blend was comprised of a 50/50 blend of two carboxylated acrylonitrile butadiene rubber latices with two different acrylonitrile/butadiene/carboxylic acid ratios 39/58/3 and 39/55/6. The nitrile blend latex was further compounded with 1 part of sulfur dispersion (crosslinker), 1 part of ZDBC dispersion (vulcanization accelerator), 3 parts of ZnO dispersion (vulcanization activator) and 15 parts of silicone emulsion (SM 2140 obtained from General Electric). The dwell time for the coating dipping was about 13 to about 15 seconds.

The cuff of the coated glove was beaded by a beader and the former was placed in an oven maintained at about 125° C. for about 20 minutes in order to cure the glove. The former bearing the glove was then removed from the oven and allowed to cool. The glove was then stripped from the former.

The glove was then post-processed by chlorination. First, the coated glove was turned inside out manually and loaded into a chlorinator. The glove was pre-rinsed 2 times for a total time of about 5 minutes. An aqueous chlorine solution of about 300 ppm chlorine was added to the chlorinator and the gloves tumbled for about 8.3 minutes. The chlorinated solution was then neutralized with 50% sodium hydroxide solution for about 4 minutes. The glove was post-rinsed 4 times for a total time of about 10 minutes. The glove was then transferred to a tumbling washer for the lubrication process. Excess water was removed from the glove by spinning the glove for about 2 minutes. The washer was then filled with an aqueous lubrication solution comprised of about 0.5 wt % of cetylpyridinium chloride and 0.15 wt % of silicone emulsion. The glove was tumbled in the lubrication solution for about 5 minutes. The lubrication solution was drained and the glove was tumbled for an additional 5 minutes. The glove was then removed from the tumbler washer and dried in a dryer with a heating cycle of about 20 minutes at about 55° C. and a cool down cycle for about 10 minutes. The glove was removed from the dryer and turned inside out manually. The glove was dried again in the dryer at about 50° C. for about 5 minutes and allowed to cool down to room temperature for about 5 minutes.

The physical properties of the powder-free coated glove prepared as set forth in Example 1 were measured according to ASTM D412-92. The gloves had a tensile strength of 4323 psi, a tensile stress at 500% of 313 psi, and an ultimate elongation of 1022%. The coefficient of friction (COF) of both the outside and inside surfaces in the palm area of the glove were measured according to ASTM D1894-95. The static and kinetic COF for the inside surface were 0.72 and 0.46, respectively. The static and kinetic COF for the outside surface were 1.22 and 1.61, respectively.

The donning characteristics of the glove were evaluated qualitatively with respect to damp skin on a scale of 1 to 5, 1 being the worst with extreme difficulties in donning the glove and 5 being the best with extreme ease in donning the glove. This determination was made by having the glove donned by a person with damp skin. The glove dons extremely well with respect to damp and wet skin with a rating of 5.

The adhesion of the coating was also evaluated qualitatively. In this test, the coated glove surface was stretched to more than 500% and the coating was rubbed repeatedly using the thumb. The coated surface was then visually examined for coating flakes and powdery substance. The adhesion of the coating was rated qualitatively on a scale of 1 to 5, 1 being the worst with the entire coating flaking off the rubber substrate and 5 being the best with no visual appearance of powdery substance on the surface of the glove. Using this test, the adhesion of the inventive coating is quite good with a rating of 5 on a scale of 1 to 5, i.e., no flaking or shedding of the powder was observed after stretching the glove to about 500% and rubbing it repeatedly with the thumb.

The finished glove was packaged as follows: a pair of gloves with a right and a left hand was manually cuffed down to about 4 inches so that the inside surface of the cuff was exposed to the outside. The left hand glove was laid flat in the left side of the inner wrap paper with the thumb exposed outward and the paper wrapped around the glove. The right hand glove was laid flat in the right side of the inner wrap paper with the thumb exposed outward and the paper wrapped around the glove. One wrapped glove was then flipped over the other to produce a rectangular wallet-shaped packet. The inner wrap with a pair of gloves was then placed in between a top web paper and a bottom web paper, and thermally sealed on all sides 50 pairs of gloves were packed into a dispenser box and 4 boxes were then packed into a carton. The packed gloves were sterilized by gamma sterilization at a dose range of 28.1 KGy and 31.1 Kgy.

The sterile glove had a tensile strength of 4309 psi, a tensile stress at 500% of 313 psi, and an ultimate elongation of 993%. The static and kinetic COF for the inside surface were 0.37 and 0.15, respectively. The static and kinetic COF for the outside surface were 0.6 and 0.8, respectively. The donning characteristics of the sterile glove were excellent with a rating of 5 with respect to damp skin on a scale of 1 to 5, i.e., no flaking or shedding of the powder was observed after stretching the glove to about 500% and rubbing it repeatedly with the thumb. The adhesion of the inventive coating was excellent with a rating of 5 on a scale of 1 to 5 (where about 4 to about 4.5 is the adhesion value exhibited by commercially available glove coatings).

Example 2

A powder-free nitrile-coated natural rubber latex glove with an intermediate natural rubber-nitrile layer between the glove and the nitrile coating was prepared as set forth in Example 1 except that the chlorine concentration in the aqueous chlorinated solution was adjusted to about 238 ppm and that the lubricant solution was applied using a spraying process as follows.

After the chlorination process, the glove was transferred to an extractor and excess water was removed from the glove by spinning the glove for about 5 minutes. The glove was then placed in a lubricator equipped with a spray gun. The glove was tumbled in the dryer maintained at about 55° C. for about 1 minute. An aqueous lubrication solution comprised of about 0.5 wt % of cetylpyridinium chloride and about 0.15 wt % of silicone emulsion was then sprayed on the glove while tumbling in the lubricator for about 156 seconds at 55° C. The spraying was stopped for about 1 minute. The spraying process was repeated again two more times. At the end of the third spraying, the glove was tumbled for about 25 minutes and allowed to cool for about 10 minutes. The glove was removed from the lubricator and turned inside out manually. The glove was dried again in the dryer at about 50° C. for about 5 minutes and allowed to cool down to room temperature for about 5 minutes.

The packed glove after gamma sterilization had a tensile strength of 4352 psi, a tensile stress at 500% of 341 psi, and an ultimate elongation of 984%. The static and kinetic COF for the inside surface were 0.41 and 0.17, respectively. The static and kinetic COF for the outside surface were 1.38 and 1.62, respectively. The donning characteristics of the sterile glove were excellent with a rating of 5 with respect to damp skin on a scale of 1 to 5. The adhesion of the coating was excellent with a rating of 5 on a scale of 1 to 5, i.e., no flaking or shedding of the powder was observed after stretching the glove to about 500% and rubbing it repeatedly with the thumb (where about 4 to about 4.5 is the adhesion value exhibited by commercially available glove coatings).

Example 3

A powder-free coated natural rubber latex glove with an intermediate natural rubber-nitrile layer between the glove and the nitrile coating was prepared as set forth in Example 1 except that the chlorine concentration in the aqueous chlorinated solution was adjusted to about 546 ppm.

Before sterilization, the glove had a tensile strength of 4324 psi, a tensile stress at 500% of 270 psi, and an ultimate elongation of 1032%. The static and kinetic COF for the inside surface were 0.39 and 0.28, respectively. The static and kinetic COF for the outside surface were 1.34 and 1.57, respectively. The donning characteristics of the sterile glove were excellent with a rating of 5 with respect to damp skin on a scale of 1 to 5. The adhesion of the coating was excellent with a rating of 5 on a scale of 1 to 5, i.e., no flaking or shedding of the powder was observed after stretching the glove to about 500% and rubbing it repeatedly with the thumb.

Example 4

A powder-free coated natural rubber latex glove with an intermediate natural rubber-nitrile layer between the glove and the nitrile coating was prepared as set forth in Example 1 except that the chlorine concentration in the aqueous chlorinated solution was adjusted to about 146 ppm.

Before sterilization, the glove had a tensile strength of 4310 psi, a tensile stress at 500% of 299 psi, and an ultimate elongation of 1042%. The static and kinetic COF for the inside surface were 1.06 and 0.64, respectively. The static and kinetic COF for the outside surface were 1.1 and 1.33, respectively. The donning characteristics of the sterile glove were good with a rating of 4 with respect to damp skin on a scale of 1 to 5. The adhesion of the coating was excellent with a rating of 5 on a scale of 1 to 5, i.e., no flaking or shedding of the powder was observed after stretching the glove to about 500% and rubbing it repeatedly with the thumb.

Examples 5–8

Powder-free coated natural rubber latex gloves with an intermediate natural rubber-nitrile layer between the glove and the nitrile coating are prepared as set forth in Examples 1, 2, 3 or 4 except that the total percent solid content for the intermediate natural rubber-nitrile blend latex is adjusted to 1.5%, 2.0%, 2.5%. and 10% [corresponding to Examples 5, 6, 7 and 8 respectively].

The gloves prepared as set forth in Examples 5–8 will have physical properties similar to those described in Examples 1 through 4. The donning characteristics of the gloves are excellent with a rating of 4 to 5 with respect to damp skin on a scale of 1 to 5. The adhesion of the coatings are excellent with a rating of 5 on a scale of 1 to 5.

Example 9

A powder-free nitrile-coated Neoprene glove with an intermediate natural rubber-nitrile layer between the glove and the nitrile coating is prepared as follows. A glove former is pre-heated to about 40° C. to about 60° C. in an oven. The preheated former is dipped into a stirred, alcohol based coagulant suspension maintained at less than about 55° C. The coagulant-dipped former is then returned to the heated oven to dry the coagulant layer.

The coagulant-coated former is dipped into a compounded neoprene copolymer latex which is maintained at about 20° C. to about 28° C. for a time sufficient to produce the desired glove thickness. The neoprene copolymer latex is compounded with stabilizers, crosslinker, vulcanization activator, vulcanization accelerators, antioxidant, antiozonant and optionally, white or colored pigments. The solid content of the compounded latex is about 48 wt. %. The former bearing the coagulated latex is then removed from the compounded neoprene copolymer latex and immediately dipped into a second rubber blend latex for a time sufficient to produce the desired thickness. The rubber blend latex is comprised of about 2.5% compounded natural rubber latex and about 2.5% of carboxylated acrylonitrile butadiene latex and about 95% water. The formulation of the compounded natural rubber latex used in this rubber latex is the same as the one used in Example 1. The ratio of acrylonitrile/butadiene/carboxylic acid for the nitrile rubber is 39/58/3.

The former is removed from the second rubber blend latex and leached in water maintained at about 60° C. The former is then dipped into a compounded nitrile blend latex with a total solid content of about 5% to form a coating on the intermediate natural rubber-nitrile blend layer. The nitrile blend latex is comprised of a 50/50 blend of two carboxylated acrylonitrile butadiene rubber latices with two different acrylonitrile/butadiene/carboxylic acid ratios, 39/58/3 and 38/55/6. The formulation of the nitrile blend latex is the same as the one used in Example 1.

The cuff of the coated glove is beaded and the former placed in an oven maintained at about 150° C. for about 20 minutes in order to cure the glove. The former bearing the glove is then removed from the oven and allowed to cool. The glove is stripped from the former. The glove is then post-processed by chlorination/lubrication according to the process set forth in Example 1 except that the chlorine concentration of the chlorinated solution is adjusted to about 344 ppm.

Before sterilization, the powder-free nitrile coated neoprene copolymer glove prepared as set forth in Example 9 will have a thickness of about 7 to about 9 mils in the palm area and a tensile strength of about 2700 to about 3200 psi, a tensile stress at 500% of about 220 to about 280 psi, and an elongation at break of about 900 to about 1100%. The coated glove has excellent donning characteristics with a rating of 5 with respect to damp skin on a scale of 1 to 5. The adhesion of the coating is excellent with a rating of 5 on a scale of 1 to 5.

Example 10

A powder-free nitrile-coated neoprene copolymer glove with an intermediate neoprene rubber-nitrile layer between the glove and the nitrile coating is prepared as set forth in Example 9 with the exception that the second rubber blend latex is comprised of about 2.5% compounded neoprene copolymer latex and about 2.5% of carboxylated acrylonitrile butadiene latex and about 95% water;. The formulation of the neoprene copolymer latex is the same used in the first neoprene copolymer latex. The ratio of acrylonitrile/butadiene/carboxylic acid for the nitrile rubber is 39/58/3.

Before sterilization, the powder-free nitrile coated neoprene copolymer glove before sterilization will have a thickness of about 7 to about 9 mils in the palm area and a tensile strength of about 2700 to about 3200 psi, a tensile stress at 500% of about 220 to about 280 psi, and an elongation at break of about 900 to about 1100%. The coated glove has excellent donning characteristics with a rating of 4 to 4.5 with respect to a damp skin on a scale of 1 to 5. The adhesion of the coating is excellent with a rating of 5 on a scale of 1 to 5.

Example 11

A powder-free nitrile-coated nitrile rubber glove with an intermediate natural rubber-nitrile layer between the glove and the nitrile coating is prepared as follows. A glove former is pre-heated to about 40° C. to about 60° C. in an oven. The preheated former then is dipped into a stirred, alcohol based coagulant suspension maintained at less than about 55° C. The coagulant layer which had been deposited on the glove former is then allowed to dry.

The coagulant-coated former is dipped into a compounded nitrile latex which is maintained at about 20° C. to about 30° C. for a time sufficient to produce the desired glove thickness. The nitrile latex is compounded with crosslinker, vulcanization activator, vulcanization accelerator, and optionally, antioxidant and white or colored pigment. The solid content of the compounded latex is about 30 wt. %. The former bearing the coagulated latex is then removed from the compounded nitrile latex and immediately dipped into a second rubber blend latex for a time sufficient to produce the desired thickness. The rubber blend latex is comprised of about 2.5% compounded natural rubber latex and about 2.5% of carboxylated acrylonitrile butadiene latex and about 95% water. The formulation of the compounded natural rubber latex used in this rubber blend latex is the same as the one used in Example 1.

The former is removed from the second rubber blend latex and leached in water maintained at about 25° C. to about 45° C. The former is then dipped into a compounded nitrile blend latex with a total solid content of about 5% to form a coating on the intermediate natural rubber-nitrile blend layer. The nitrile blend latex is comprised of a 50/50 blend of two carboxylated acrylonitrile butadiene rubber lattices with two different acrylonitrile/butadiene/carboxylic acid ratios, 39/58/3 and 39/55/6. The formulation of the nitrile blend latex is the same as the one used in Example 1.

The cuff of the coated glove is beaded and the former placed in an oven maintained at about 125° C. for about 20 minutes in order to cure the glove. The former bearing the glove is then removed from the oven and allowed to cool. The glove is stripped from the former. The glove is then post-processed by chlorination/lubrication according to the process set forth in Example 1.

Before sterilization, the powder-free nitrile coated nitrile glove prepared as set forth in Example 10 will have a thickness of about 4 to about 7 mils in the palm area and a tensile strength of about 2700 to about 3500 psi, a tensile stress at 500% of about 600 to about 1000 psi, and an elongation at break of about 500% to about 800%. The coated glove has excellent donning characteristics with a rating of 5 with respect to dry and damp skin on a scale of 1 to 5. The adhesion of the coating is excellent with a rating of 5 on a scale of 1 to 5. The adhesion of the coating is excellent with a rating of 5 on a scale of 1 to 5.

Example 12

A powder-free nitrile-coated nitrile glove with an intermediate rubber-nitrile layer between the glove and the nitrile coating is prepared as set forth in Example 11 with the exception that the second rubber blend latex is comprised of about 2.5% compounded nitrile latex and about 2.5% of carboxylated acrylonitrile butadiene latex and about 95% water. The formulation of the compounded nitrile latex is the same used in the first compounded nitrile latex that makes up the nitrile base glove. The ratio of acrylonitrile/butadiene/carboxylic acid for the carboxylated nitrile rubber used in the blend is 39/58/3.

Before sterilization, the powder-free nitrile coated nitrile glove will have a thickness of about 4 to about 7 mils in the palm area, a tensile strength of about 2700 to about 3500 psi, a tensile stress at 500% of about 600 to about 1000 psi, and an elongation at break of about 500% to about 800%. The coated glove has excellent donning characteristics with a rating of 5 with respect to dry and damp skin on a scale of 1 to 5. The adhesion of the coating is excellent with a rating of 5 on a scale of 1 to 5.

The foregoing description and examples relate only to preferred embodiments of the present invention and numerous changes and modifications may be made therein without departing from the spirit and scope of the invention as defined in the following claims.

What is claimed is:

1. A powder-free elastomeric glove having an internal surface comprising a first elastomeric layer, a second intermediate layer of a rubber blend comprised of a synthetic rubber and nitrile rubber disposed on said first layer and a third nitrile rubber coating layer disposed on said intermediate layer.

2. The glove of claim 1 wherein the elastomeric layer is a natural rubber layer.

3. The glove of claim 1 wherein the elastomeric layer is a neoprene layer.

4. The glove of claim 1 wherein the elastomeric layer is a nitrile layer.

5. The glove of claim 1 wherein the elastomeric layer is a synthetic polyisoprene layer.

6. The glove of claim 1 wherein the elastomeric layer is comprised of the synthetic rubber used in the intermediate layer.

7. The glove of claim 6 wherein the synthetic rubber is neoprene rubber.

8. The glove of claim 6 wherein the synthetic rubber is nitrile rubber.

9. The glove of claim 6 wherein the synthetic rubber is a synthetic polyisoprene.

10. The glove of claim 1 wherein a third nitrile rubber coating layer is comprised of a carboxylated acrylonitrile butadiene rubber.

11. The glove of claim 10 wherein the nitrile rubber is comprised of a carboxylated acrylonitrile butadiene rubber having an acrylonitrile content of about 25 to about 40 parts, a butadiene content of about 55 to about 68 parts and a carboxylic acid content of about 3 to about 6 parts.

12. The glove of claim 10 wherein the nitrile rubber coating is comprised of a blend of two carboxylated acrylonitrile butadiene rubbers with different acrylonitrile/butadiene/carboxylic acid ratios.

13. The glove of claim 12 wherein each of the two carboxylated acrylonitrile butadiene rubbers with different acrylonitrile/butadiene/carboxylic acid ratios has an acrylonitrile content of about 25 to about 40 parts, a butadiene content of about 55 to about 68 parts and a carboxylic acid content of about 3 to about 6 parts.

14. A process for making a powder-free elastomeric glove having an internal surface comprising a first elastomeric layer, a second intermediate layer of a rubber blend comprised of a synthetic rubber and nitrile rubber disposed on said first layer and a third nitrile rubber coating disposed on said intermediate layer, comprising the steps of:

(a) dipping a former into a coagulant dispersion to deposit a coagulant layer on the former;

(b) dipping the former with the deposited coagulant layer into an elastomer to produce a second layer comprising coagulated elastomeric layer thereon;

(c) dipping the second layer of coagulated elastomer into a blend of a synthetic rubber and a nitrile rubber dispersion to form an intermediate layer on the glove;

(d) dipping the intermediate layer of a synthetic rubber and a nitrile rubber into a powder-free dispersion comprised of a nitrile rubber dispersion and a silicone emulsion;

(e) curing the layers and the coating on the former;

(f) stripping the glove from the former;

(g) turning the glove so that the coated side of the article is on the exterior of the glove;

(h) treating the glove to remove powder;

(i) drying the glove;

(j) turning the glove so that the coated side of the glove is on the interior of the glove; and (k) drying the glove.

15. The process of claim 14 wherein the step of treating the glove to remove powder comprises the step of immersing the glove into an aqueous chlorinated solution followed by the step of rinsing the glove.

16. The process of claim 15 comprising the additional step of applying a lubricant solution to the coated surface of the glove after the chlorination and rinsing steps.

17. The process of claim 14 comprising the additional step of leaching the glove in water after the former is dipped into the synthetic rubber and nitrile rubber dispersion to produce the intermediate layer.

18. The process of claim 17 wherein the step of treating the glove to remove powder comprises the step of immersing the glove into an aqueous chlorinated solution followed by the step of rinsing the glove.

19. The process of claim 18 comprising the additional step of applying a lubricant solution to the coated surface of the glove after the chlorination and rinsing steps.

* * * * *